May 22, 1928.
F. W. MARTIN
CONTAINER
Filed Sept. 14, 1925
1,670,864
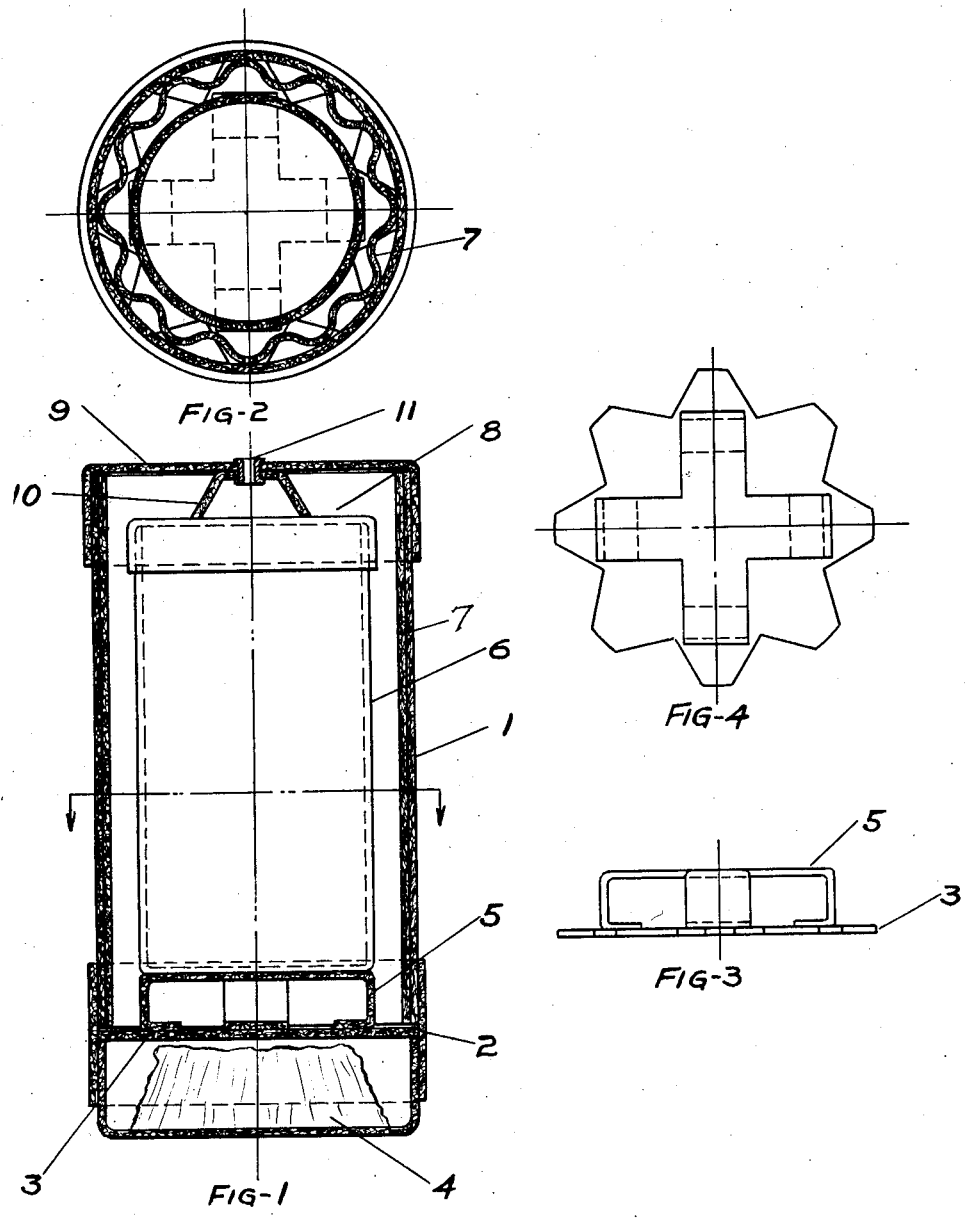
Frederick W Martin
INVENTOR Patented May 22, 1928.

1,670,864

UNITED STATES PATENT OFFICE.

FREDERICK W. MARTIN, OF BRONXVILLE, NEW YORK.

CONTAINER.

Application filed September 14, 1925. Serial No. 56,162.

This invention relates to containers which are used in handling frozen confections, such as ice cream, water ices and so forth.

Recently carbon dioxide snow has been used for packing ice cream in place of ice which has been the medium used for many years. When carbon dioxide snow is used, it is usually placed in the bottom of a container. A small container in which the ice cream is placed is set down on the carbon dioxide snow and the lid placed over the larger container and the evaporation of the snow which has a temperature of approximately 110° below zero, maintains a temperature in the container sufficiently low to prevent the frozen confection melting until the snow has evaporated. With this method of packing frozen confections, the container holding the confection comes in direct contact with the carbon dioxide snow and after a period of contact, the confection in the lower part of the container becomes frozen so hard that it is practically impossible to ladle it out of the container. Due to the temperature of the carbon dioxide snow if it is handled with the bare hands, it will so affect the flesh as to have the effect of a severe burn.

It is one of the primary objects of this invention to provide a container which will evenly preserve in a frozen condition, the confection and at the same time to make a container such that the frozen snow cannot be removed unless the outside container is deliberately broken apart.

How the foregoing together with such other suggestions as may hereinafter appear or are incident to my invention, are realized, is illustrated in the accompanying drawings, wherein Fig. 1 shows a frozen confection container placed inside of the protecting container;

Fig. 2 is a section through Fig. 1;

Fig. 3 is a side elevation of the separator and spacer used between the carbon dioxide snow and the confection container;

Fig. 4 is a plan view of the separator and spacer.

Referring to Fig. 1 it will be seen that the complete container consists of outer receptacle 1 which is closed at the bottom and is provided with a recess or groove 2 running around the interior of the container. Into this recess the separator 3 is inserted and locked after the carbon dioxide snow 4 has been placed in the container. On the top of the separator 3 is provided a spacer 5, the purpose of which is to hold the confection receptacle 6 away from the carbon dioxide snow. Between the outer receptacle and the confection receptacle, a sleeve 7, Fig. 2 made of corrugated cardboard is provided. This permits the gas coming from the carbon dioxide snow to flow toward the upper end of the container and into the cavity 8 provided between the confection receptacle and the outside container. On the container cap 9, an inverted U-shaped separator 10 is riveted to the cap with rivet 11. This rivet provides a vent for the gas to escape and eliminates the possibility of the cover being forced off by the gas accumulating in the container.

With the construction as outlined, the gas flowing around the confection receptacle will preserve the confection at an even temperature inside the receptacle and prevent the excessive hardening of the confection at the bottom of the confection receptacle. It also encases the carbon dioxide snow and eliminates the possibility of serious injury which might occur if it was possible for the snow to be taken out of the outside container when the confection receptacle was removed. In order to permit the gas produced by the snow circulating through the container, the edge of the separator 3, Fig. 4 is notched so as to permit the gas to flow into the balance of the container.

When it is desired to pack a frozen confection, a piece of the carbon dioxide snow 4 is put in the bottom of the outside container 1. After this has been done, the separator 3 is forced into the container and shoved down with the corrugated sleeve 7 until the separator snaps into recess 2. On the top of the separator a spacing piece 5 is provided so that when the confection receptacle 6 is put into place, it is so held as to prevent close contact with the snow. After the confection receptacle is inserted the cap 9 is put in place and the separator 10 maintains a space between the top of the confection receptacle and the cap of the outside container. The rivet 11 which fastens the separator to the cover, provides a vent for the gas produced by the carbon dioxide snow and this causes a circulation of the gas around the entire confection receptacle.

Various constructions other than that described, could be used to obtain the same results.

I claim:

1. A container, a false bottom for said container, said container having means spaced from the bottom thereof for permitting said false bottom to be inserted and to hold said false bottom locked therein, and means on the upper side of said false bottom for supporting a package spaced above said false bottom.

2. A container having a groove in its side wall, a false bottom having tongues on its periphery, said tongues being adapted to snap into said groove when forced down into the container, spacing means on the upper side of said false bottom, said false bottom when positioned in the container dividing same into a lower refrigerant holding chamber and an upper package holding chamber.

3. A container comprising in combination a receptacle, a perforate partition therein carried by the walls thereof, a refrigerant chamber at one side of said partition, means giving access to said refrigerant chamber, and a storage chamber on the other side of said partition.

4. A container comprising in combination an outer receptacle, a perforate partition therein carried by the walls thereof, a refrigerant chamber at one side of said partition, means giving access to said refrigerant chamber, and an inner removable receptacle spaced from the outer receptacle in the chamber on the other side of said partition.

5. A container comprising in combination an outer receptacle having a false bottom adjacent the true bottom, one of said bottoms being removably secured in position, and an inner receptacle in the chamber above said false bottom.

6. A container comprising in combination an outer receptacle having a false bottom adjacent the true bottom, one of said bottoms being removably secured in position and the false bottom including a means for spacing the contents of the container therefrom, and an inner receptacle in the chamber above said false bottom adapted to rest upon said separator.

In testimony whereof, I have hereunto signed my name.

FREDERICK W. MARTIN.